Dec. 19, 1922.
H. P. PRITCHARD.
BORING OR SURFACING TOOL HOLDER.
FILED DEC. 22, 1919.
1,439,190
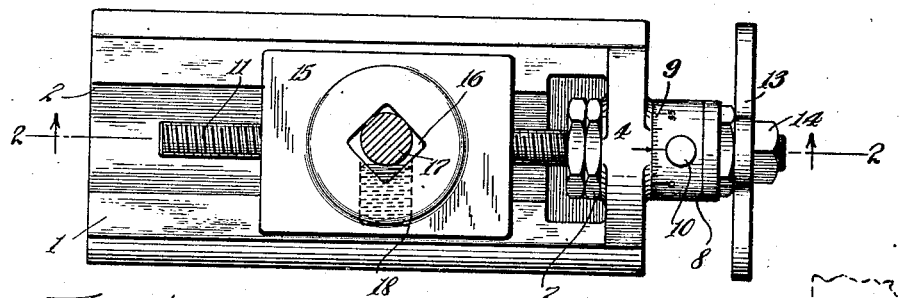
Fig. 1.
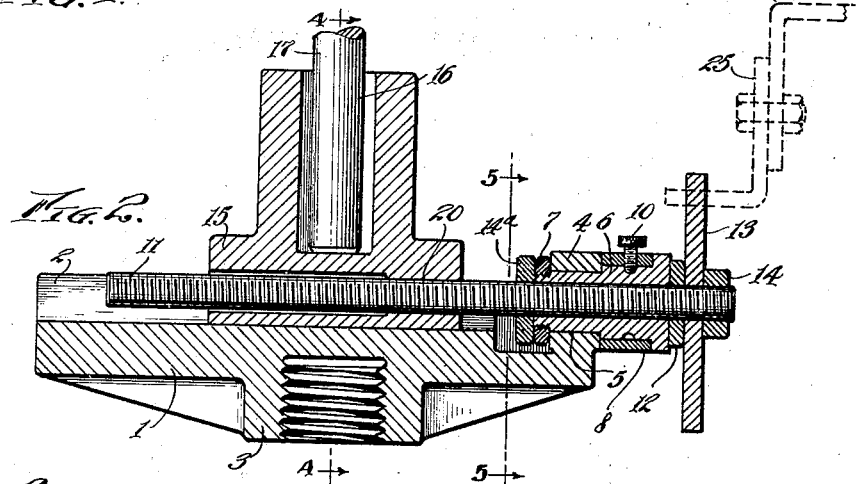
Fig. 2.
Fig. 3.
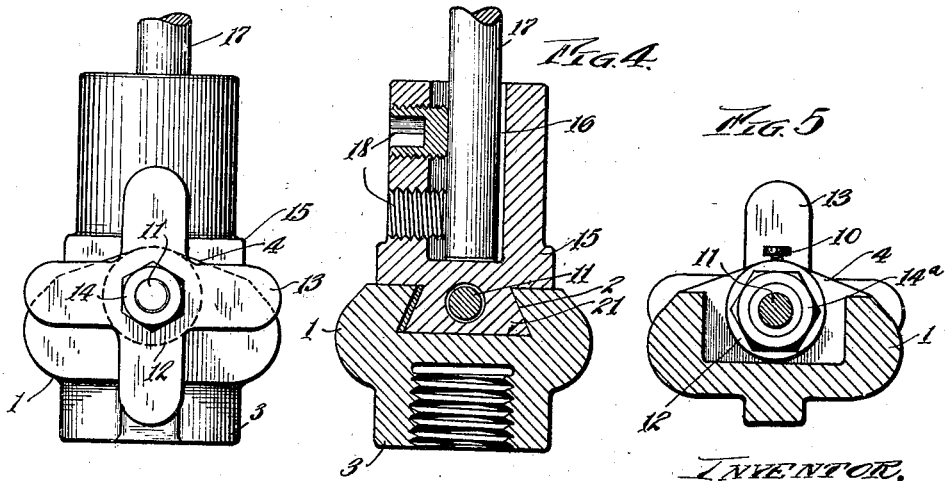
Fig. 4.
Fig. 5.
INVENTOR,
H. P. Pritchard
By John A. Bommhardt.
Atty.

Patented Dec. 19, 1922.

1,439,190

UNITED STATES PATENT OFFICE.

HOWARD P. PRITCHARD, OF CLEVELAND, OHIO.

BORING OR SURFACING TOOL HOLDER.

Application filed December 22, 1919. Serial No. 346,491.

*To all whom it may concern:*

Be it known that I, HOWARD P. PRITCHARD, a citizen of the United States, residing at Cleveland, in the county of Cuyahoga and State of Ohio, have invented certain new and useful Improvements in Boring or Surfacing Tool Holders, of which the following is a specification.

This invention relates to a device for use in connection with drill presses, vertical boring mills, milling machines and the like, it is particularly adapted for boring out cored openings to their true size and, owing to its particular construction is adapted for use in die work when surfacing and bottoming, or finishing the bottoms of cored openings.

A particular advantage gained by the use of this tool is in the adjustability. The device as shown being capable of drilling and boring holes from the smallest size to several inches and further, and the construction permits the tool to be advanced for successive cutting operations by the movement of the adjusting screw either over comparatively long distances or over very minute ones with each adjustment, the distance of travel being accurately determined by the employment of a graduated dial to indicate the movement thereof.

Further objects of the invention are in the provision of means for positioning a tool eccentric with respect to the axis of the machine spindle for the purpose of enlarging an opening initially made for the tool such as a cored opening and the provision of a tool which will be composed of a minimum number of parts so arranged as to provide a simple, efficient and very durable construction, and the provision of means for so holding the cutting tool as to permit of using one with an extremely short shank, preventing any possibility of the tool breaking or vibrating.

With the foregoing and other objects in mind the invention consists of the novel construction and combination of parts hereinafter described, illustrated in the accompanying drawings and pointed out in the appended claims, reference being had to the accompanying drawings wherein like reference numerals designate similar parts of reference throughout the various views, Fig. 1 is a plan view of the device; Fig. 2 is a central longitudinal section on line 2—2 of Fig. 1; Fig. 3 is an end elevation as viewed from the right of Fig. 2 and Figs. 4 and 5 are sectional details taken on the corresponding lines of Fig. 2.

The device as shown comprises a base 1 provided with a dove-tailed slide-way 2 and an internally threaded boss 3 whereby the device may be applied to the spindle of the actuating machine. The body 1 is provided at one end with a vertical extension or ear 4 provided with a bore 5 into which is rotatably mounted a bushing 6 which is threaded to receive the screw 11 which is rigidly held in the bushing by the nuts 12 and 14ª on the screw, the bushing being held in the ear by the nut 7 on the threaded end of the bushing, which nut can be adjusted to take up wear. The bushing supports a collar 8 which is provided with graduations 9. This collar is free to rotate about the bushing and is locked thereon after the proper adjustment has been obtained, by the set screw 10. The bushing 6 is free to rotate within the ear 4 and is itself provided with a bore through which is passed a lead-screw 11, and said screw may be locked against further rotation within the bushing 6 by lock nuts 14 and 14ª. A star wheel 13 is fixed on the end of the screw 11 between the nuts 12 and 14. Mounted within the dove-tailed guideway 2 is a socket piece comprising a movable head 15 and said head is provided with a squared opening 16 within which is placed the cutting tool 17. This socket piece is preferably made cylindrical to permit of insertion within a previously made opening in the material to be machined and due to this construction a cutting tool with a very short shank is permitted to be used, this feature effectively eliminates the possibility of breakage of the tool and prevents the same from vibrating or chattering. This tool may be of any desired shape or form and is secured within the opening 16 by means of the set screws 18 which are threaded within the head 15.

The aforementioned screw 11 is threaded through a bore 20 in the dove-tailed base 21 of the head 15 thereby to cause the head 15 to move longitudinally within the guideway 2. The aforementioned star wheel 13 is engaged upon each rotation of the device by any convenient adjustable stop carried by the main frame of the actuating machine, one form thereof being indicated in dotted lines at 25 of Fig. 2, and thus upon each rotation of the tool the lead-screw 11 and its bushings 6 are given one quarter or other turn according to the number of arms on the star wheel, which causes the head 15 to be moved within the aforementioned guideways. This method is employed only in surfacing or in bottoming and permits a spiral cut to be had, each succeeding cut of which will be upon the same plane, and in this manner the device may be used upon a drill press, lathe or milling machine and produces a result equal to that obtained by the use of either a shaper or planer. When the device is to be used for boring in a lathe or boring mill, or at any time when a helical cut is to be obtained, it is evident that the screw 11 is merely for the purpose of adjustment and by the use of the index collar 8 this may be determined very accurately. When used in surfacing and when it is desired to determine the depth of a cut accurately, say one-tenth of an inch, the collar is set at zero and then the bushing and screw are turned until the collar indicates an advance of one-tenth of an inch, by relation to the index on the ear 4. Then the tool will start to cut a tenth of an inch deep, and then if it is desired to cut another tenth of an inch the collar is set back to zero and the bushing is turned again in the same manner.

It is obvious that an operating handle may be utilized for the same purpose as the star wheel, taking the place thereof and thus permitting the tool to be adjusted manually, and further modifications may be made in detail within the scope of the appended claims, and I do not wish to limit myself in the construction of the device further than is required by the state of the art or that which comes within the scope of the aforesaid claims.

I claim:

1. A tool holder comprising a base having a bearing, a tool socket slidable on the base toward and from said bearing, a screw threaded into said socket to adjust the same, a bushing rotatably mounted in the bearing, said screw extending through the bushing, nuts on the screw, clamped against opposite ends of the bushing, means to rotate the screw and bushing and a graduated collar rotatably mounted on the bushing and cooperating with an index on the bearings.

2. A tool holder comprising a base having a bearing ear, a tool socket slidable on the base toward and from said ear, a screw threaded into said socket to adjust the same, a bushing fixed to the screw and rotatably mounted in said bearing ear, and a graduated collar rotatably mounted on the bushing for adjustment around the same and cooperating with an index on the ear to indicate the setting of the screw.

3. A tool holder comprising a base having a bearing ear, a tool socket slidable on the base toward and from said ear, a screw threaded into said socket to adjust the same, a bushing fixed to the screw and rotatably mounted in said bearing ear, and a graduated collar rotatably mounted on the bushing for adjustment around the same and cooperating with an index on the ear to indicate the setting of the screw, said collar being provided with means to fasten the same to the bushing.

In testimony whereof, I do affix my signature in presence of two witnesses.

HOWARD P. PRITCHARD.

Witnesses:
JOHN A. BOMMHARDT,
ROBERT L. BRUCK.